Nov. 21, 1967 W. NIEMEYER 3,353,213
GRANULATING DEVICE
Filed Nov. 16, 1965 2 Sheets-Sheet 2

INVENTOR:
WALTER NIEMEYER
BY
Marzall, Johnston, Cook & Root
ATT'YS

United States Patent Office 3,353,213
Patented Nov. 21, 1967

3,353,213
GRANULATING DEVICE
Walter Niemeyer, Remscheid, Germany, assignor to Barmer Maschinenfabrik Aktiengesellschaft, Wuppertal-Oberbarmen, Germany
Filed Nov. 16, 1965, Ser. No. 508,092
Claims priority, application Germany, Nov. 25, 1964, B 79,478
6 Claims. (Cl. 18—12)

ABSTRACT OF THE DISCLOSURE

A granulating device in which a thermoplastic material is extruded from a die with a rotary blade adapted to sweep across the die face, the drive shaft of the rotary blade being rapidly axially shifted by a piston which in turn is carried by a threaded cylinder for fine adjustment of the rotary blade near the die face.

---

This invention relates to a granulating device or apparatus capable of cutting extruded strands of a thermoplastic material into granules or pellets of substantially uniform shape and size. More particularly, the invention is directed to apparatus for granulating a thermoplastic material wherein a rotary cutter can be rapidly and precisely aligned by axial adjustments with reference to the position of the extrusion die face from which the plastic material is extruded.

In the construction of known granulating devices, especially in the type of granulator in which the plastic material is extruded and cut while submerged under water or another liquid medium, it has been a general practice to position the rotary cutting tool consisting essentially of one or more knife blades mounted in a rotating tool head such that during the granulating process the face or cutting edges of the knife assembly are lightly pressed by means of a spring or the like against a generally annular die plate containing holes or orifices through which the material to be granulated is extruded. In order to engage and disengage the rotary cutter from the extrusion die plate before and after the granulating or cutting operation, it has also been proposed that the rotary cutter with its drive shaft be axially shifted toward and away from the die plate by means of a pneumatically or hydraulically operated piston. The forward and backward stroke of the piston and the corresponding two positions of the rotary cutter are determined by stroke limiting means such as fixed stops acting at a spaced distance along the piston arm to limit its travel or by the front and rear face walls of the piston cylinder or housing which limit the axial distance traveled by the piston head.

During the granulating operation, the pressure under which the rotary cutter rests against the flat surface of the extrusion die plate can vary widely depending upon the particular thermoplastic material being extruded and especially upon the relatively high temperatures under which the extruder must be operated. The differences in temperature between various elements of the apparatus and the resulting difference in heat expansion of these elements results in a greater pressure being exerted by the die plate on the knife blades or their cutting edges, and this pressure tends to increase the amount of wear on the die plate and also to severely impair the useful life of the knife blades through their constant scraping across the surface of the die plate. On the other hand, if the cutting edges of the rotary cutter are positioned at too great an interval from the surface of the die plate, the extruded strands cannot be properly cut and one obtains granules or pellets with a non-uniform size and shape. The precise alignment of the rotary cutter with the exposed face of the extrusion die is therefore a critical factor in the granulating operation and must be maintained regardless of differences in the extrusion temperature.

Accordingly, it is an object of the present invention to provide a novel granulating apparatus combining piston means for the rapid axial shifting of the rotary cutter toward and away from the extruder die with means for the fine adjustment of the rotating cutting edges in precise alignment with the planar die face from which one or more strands of plastic material are being extruded. Another object of the invention is to provide means for adjusting the axial position of the rotary cutter for different extrusion temperatures both before and during the extrusion and granulating operation.

Still another object of the invention is to provide both rapid and fine axial adjustment of the rotary cutter in a precise axial position with reference to the die plate in such a manner that this position can be maintained without play or disturbance during the granulating operation.

Yet another object of the invention is to prevent excessive wear of the die plate and the knife edges while still achieving an optimum cutting effect in sizing and shaping the granules of extruded material.

These and other objects and advantages of the invention will become more apparent upon consideration of the following detailed description taken in conjunction with the accompanying drawing wherein.

In particular, the objects and advantages of the invention are achieved by employing a novel and improved apparatus for granulating a thermoplastic material comprising means for extruding the thermoplastic material including a die having a planar face from which said material issues as at least one strand, rotary cutting means including a cutter head on a rotatable and axially slidable drive shaft and a knife assembly mounted on said cutter head to sweep across said planar die face and cut the extruded material into granules, piston means including a piston housing secured against rotation around its axis and a piston arm operatively connected to the rotary cutting means for rapid axial shifting of this rotary cutting means to and from the planar face of the die, and fine adjusting means including a rotatable and axially fixed cylindrical member in threaded supporting and connecting engagement with the piston housing for slow and precise axial shifting of the piston means together with the rotary cutting means toward and away from the planar die face. It is also highly desirable to employ additional means for adjustably counteracting the rotational movement of the cylindrical member employed for the fine adjustment of the rotary cutting means, such that the cylindrical member can be rotatably actuated, preferably by manual operation, but without permitting play or disturbance of its rotational position by machine vibrations or similar factors.

Figure 1:
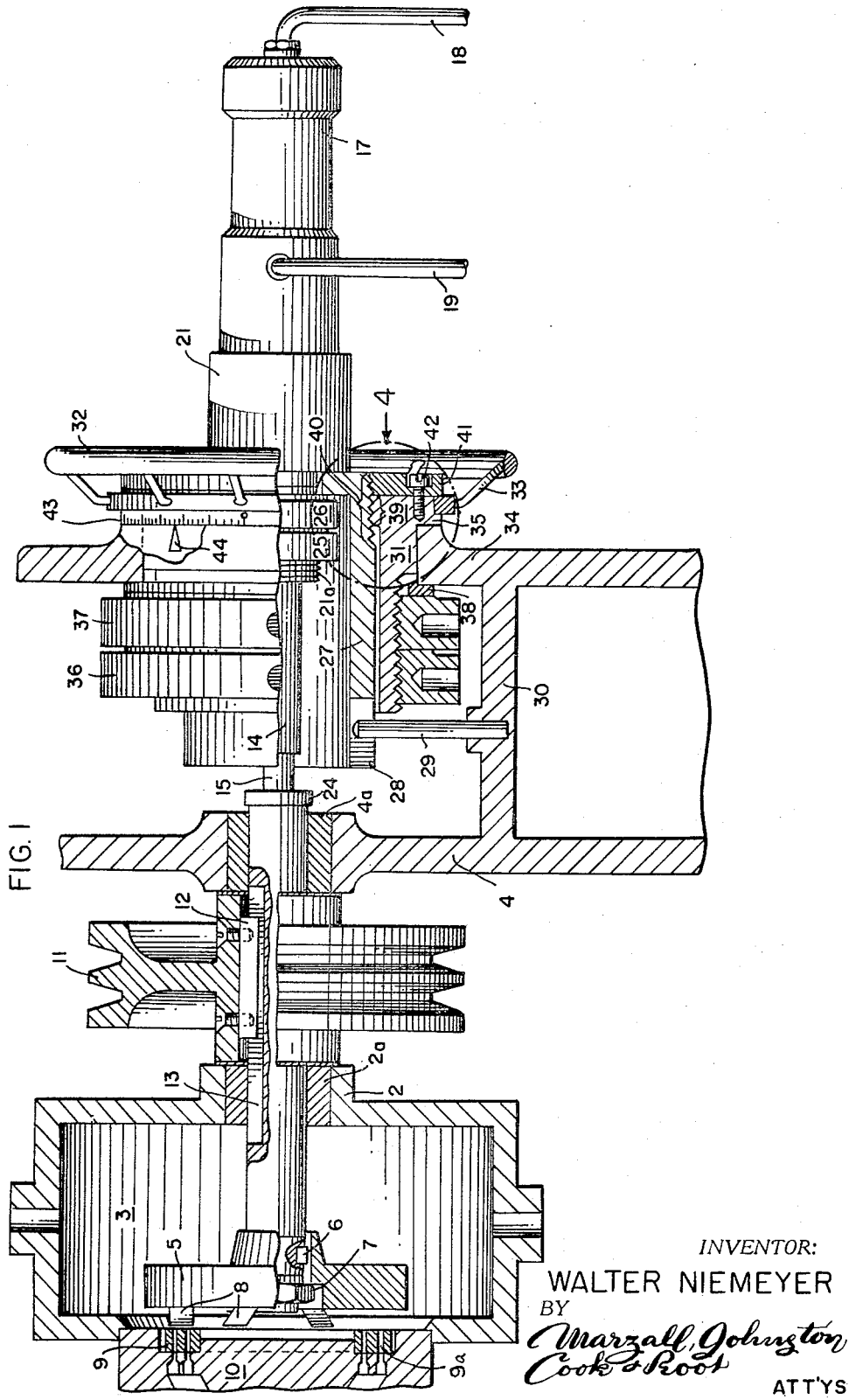
FIG. 1 is a side elevational view, partly in cross-section taken along the axis of rotation of the rotary cutter with its drive shaft and connected piston means.

As illustrated by the specific embodiment of the invention in FIG. 1 of the drawing, the rotatable drive shaft 1 is journalled in one wall 2 of the water chamber 3 and is supported for both rotatable and axial movement in a predetermined path by the chamber wall bearing member 2a and a similar annular bearing member 4a in a stationary upright support 4 of the housing or framework for the granulating apparatus. At one end of the drive shaft 1 within the water chamber 3, a rotary tool head 5 is connected firmly for rotation with the drive shaft, for example by means of a suitable key 6 in oppositely disposed keyways and by a nut 7 which also serves to hold a number of knife blades 8 in position on the rotary head. This rotary cutter consisting of the rotating head 5 and its knife assembly 8 can be constructed in any conventional manner, and additional means can be provided to adjust the plane of rotation of the cutting edges of the knife blades with reference to the longitudinal axis of the drive shaft 1.

In FIG. 1, the knife blades 8 are mounted with their cutting or granulating edges rotating in a transverse plane which can be adjustably spaced a very small distance from and parallel to the open face of the annular die plate 9 containing a plurality of orifices 9a through which the molten thermoplastic material is extruded into the path of the cutting edges of the rotating knife assembly. The annular die plate 9 is seated in an extrusion head 10 at one end of a conventional screw extruder which has been omitted from the drawing. Depending upon the melting point of the thermoplastic material, the extruder including the extrusion head 10 with annular die plate 9 must be maintained at a relatively high temperature, whereas the cooling liquid in the water chamber 3 not only acts to cool and solidify the extruded strands of the molten material but also maintains the cutting head 5 at a substantially lower temperature than the extrusion head 10. As a result, these oppositely disposed extrusion and cutting elements must be adjusted in order to compensate for various degrees of heat expansion if one is to maintain a precise spacing or engagement of the cutting edges in relation to the annular die plate 9. This precise adjustment of the rotary cutting head and its knife assembly in accordance with the invention is described in greater detail hereinbelow.

The cutter assembly 5 and drive shaft 1 are rotated by the wheel or disc 11 which in turn is driven by any suitable motor through a drive gear or the like (not shown). By using a variable speed motor, the rate of rotation of the cutter assembly 5 can be varied so as to cut granules or pellets of different lengths. The rotational movement of the drive disc 11 is transmitted to the drive shaft 1 by means of the connecting lock spring or key 12 fitted into the axial slot or keyway 13 of the drive shaft 1, the key and keyway being constructed and arranged in such a manner that the drive shaft 1 can be axially shifted with reference to the stationary elements of the apparatus such as the support 4 and the container 2 in fixed position with reference to the extruder 10. Thus, the keyway 13 is sufficiently long to permit a rapid axial shifting of the cutter assembly 5 back and forth between the vertical side walls of the water chamber 3 as well as a relatively slight or finely adjusted axial movement of the cutter assembly 5 in achieving the correct cutting position of the knife blades 8 with respect to the annular die plate 9.

Figure 2:
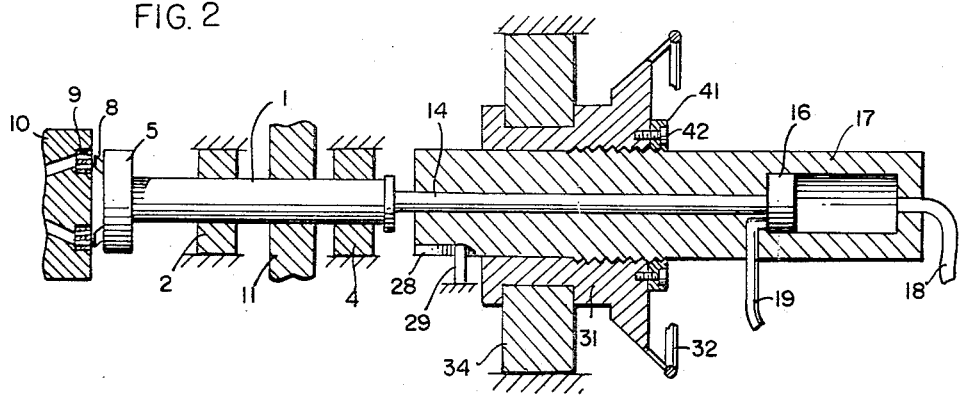
FIG. 2 is a reduced schematic representation of the apparatus according to FIG. 1, with various elements or parts omitted or simplified in order to more clearly show the exact manner in which the apparatus functions.
Figure 3:
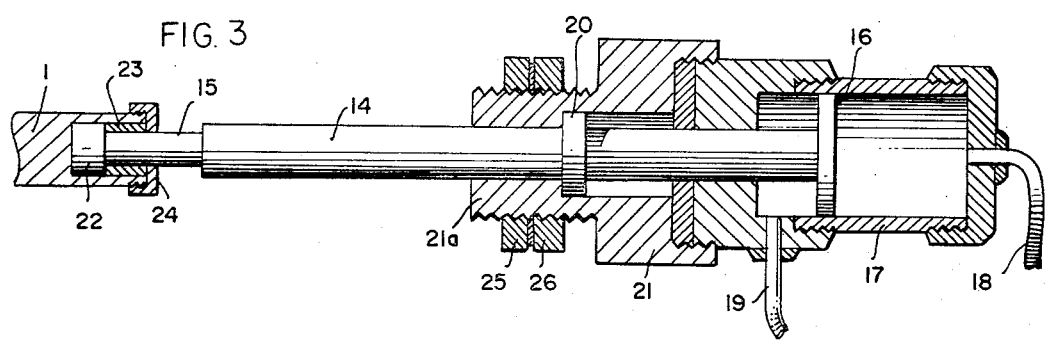
FIG. 3 is a cross-section taken along the longitudinal axis of the piston cylinder and piston arm which in turn is connected to the drive shaft of the rotary cutter, the remaining elements of FIG. 1 having been omitted.

The axial movement of the cutter assembly 5 is controlled or actuated by an axially adjustable piston assembly consisting essentially of the piston arm 14 having a radially reduced extension 15 operatively connected to the drive shaft 1 for axial movement thereof without play, a piston head 16 mounted on the arm and a piston cylinder or housing 17 in which the piston head is seated in the usual manner. The piston and cylinder, as shown in greater detail in FIGS. 2 and 3, can be readily adapted for pneumatic or hydraulic operation by means of the flexible conduits or fluid lines 18 and 19, such that fluid pressure through line 18 forces the piston forward together with the connected drive shaft 1 and cutter assembly 5 to a closed position in which the knife blades 8 are in a cutting position on the face of the die plate 9. In order to rapidly withdraw the cutter assembly 5 away from the die plate 9, fluid pressure is exerted through conduit 19 while being exhausted through conduit 18 so that the piston is driven backward to an open position. The stroke of the piston can be limited by the predetermined length of the cylinder bore receiving the piston head as indicated in FIG. 2 or by means of an annular offset or collar 20 coming in contact with axially displaced inwardly projecting annular shoulders in a cylindrical extension 21 of the piston housing, for example as illustrated in FIG. 3. It will be apparent that various means can be adopted for limiting the piston stroke to preset open and closed positions for the rapid axial adjustment of the cutter assembly 5 toward and away from the die plate 9.

As further illustrated in FIG. 3, the radially recessed cylindrical extension 15 of the piston arm 14 is journalled within the drive shaft 1 so that the drive shaft rotates freely around the piston arm but does not exhibit any axial play when actuated by the axial shifting of the piston arm. This can be accomplished, for example, by means of a radially projecting head or cap 22 which is trapped or engaged in a correspondingly shaped socket within the drive shaft 1. This socket can be carefully formed by an annular bearing insert 23 held in place by the threaded cap 24. Again, it will be apparent that various means can be employed to connect the piston arm 14 to the drive shaft 1 such that the drive shaft is freely rotatable without any axial play in the connecting linkage.

Referring again to FIG. 1, the piston cylinder 17 with its cylindrical extension 21 has an outer circumferential thread 21a permitting the grooved nuts 25 and 26 to fasten or clamp an axially adjustable and non-rotating sleeve 27 firmly to the housing of the piston. This sleeve 27 is provided at its open end with a longitudinal slot 28 running parallel to the central axis of the sleeve and adapted to receive a guide or fixed pin 29 seated firmly in the stationary framework or horizontal member 30 of the stationary upright 4. The slot 28 is sufficiently elongated so that it does not interfere with the longitudinal movement of the sleeve 27 as it is axially shifted together with the remainder of the piston assembly. At the same time, the pin 29 prevents the piston assembly from rotating about its axis. As indicated in FIG. 2, this non-rotatable sleeve can also be made an integral or unitary part of the piston cylinder.

The piston cylinder or housing is threadably engaged and supported on the outer circumference of the sleeve 27 by means of a rotatable wheel consisting of the cylindrical member or adjusting sleeve 31 which can be manually rotated by the hand grip or ring 32 attached thereto by a number of brackets or spokes 33. This adjusting wheel or cylindrical sleeve member 31 is mounted for rotation on the stationary upright 34 of the apparatus framework. Although this cylindrical member is quite free to rotate coaxially around the piston assembly, it is axially fixed by means of the radially projecting flange 35 at one end and by the two counterthreaded nuts 36 and 37 at the other end as axial limiting means on either side of the stationary upright 34. A lubricated bearing ring or annular sealing gasket 38 is preferably inserted between the counterthreaded nuts and the stationary upright so that the bearing surfaces of the rotatable cylinder 31 can be easily moved even through axially fixed to the stationary framework.

Figure 4:
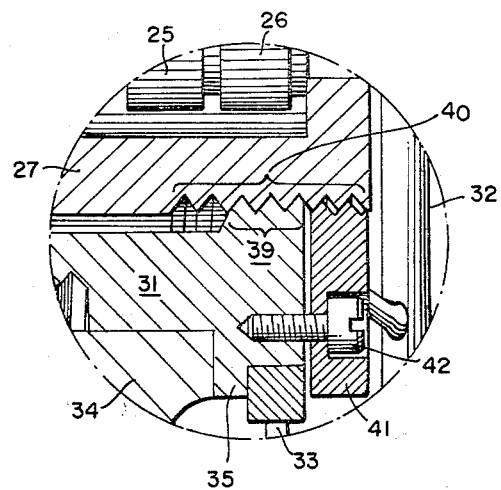
FIG. 4 is an enlarged cross-sectional fragmentary view corresponding to that portion of FIG. 1 encircled by the dotted lines I.

As shown in somewhat greater detail in FIG. 4, an inwardly projecting threaded portion 39 on the inner diameter of the adjusting cylinder or sleeve 31 is capable of inter-acting with a corresponding outer thread 40 on the piston sleeve 27 so that the rotation of the axially fixed wheel 31 by manual operation of ring grip 32 causes the entire piston assembly to shift axially with reference to the stationary upright 34 as well as other axially fixed elements of the apparatus. Since the diameter of the engaging threads 39 and 40 is relatively large, a single rotation of the cylindrical member 31 produces a very short axial shifting of the piston assembly corresponding to one turn of the threads. This slight axial movement is in turn transmitted through the piston arm 14 and its connecting linkage 15 to the drive shaft 1 which in turn transmits the same axial movement to the rotary cutting head 5.

In order to prevent any rotational play of the cylindrical member 31 and a corresponding undesirable axial movement of the threaded adjustable sleeve 27, it is preferable to attach a detachable or adjustable lock nut 41 by means of at least one set screw 42 to the adjusting wheel or cylindrical sleeve 31. This lock nut 41 can be threadably engaged or seated on the thread 40 of the sleeve 27 in such a manner that pressure exerted by the set screw 42 is transmitted to the threaded surfaces so as to provide sufficient frictional force preventing undesirable rotational play of the cylindrical member 31 even though it still remains possible to manually operate this adjusting cylindrical member. In other words, the lock nut 41 provides a positive and adjustable frictional contact between the adjusting sleeve 31 and the adjustable sleeve 27 so that one can freely turn the ring grip 32 at any time without encountering rotational play, or else one can tighten the set screw 42 in order to completely freeze the cylindrical member 31 at any desired position. It will be apparent that other means can also be substituted in place of the lock nut 41 and set screw 42 in order to provide a frictionally retarding pressure against the rotational movement of the cylindrical member 31.

On the outer circumference of the flange portion 35 of the adjusting sleeve or wheel 31 and adjacent to the upright supporting member 34, there is engraved a calibrated scale 43 whereby the fine axial adjustment can be measured by the oppositely disposed pointer or notch 44 on the upright 34. Of course, the dividing lines of the scale can also be numbered as an aid in reading the scale.

The fine adjustment of the gap space between the cutting blades and the die plate can be accomplished before or during the granulating process. In general, before the extrusion of the thermoplastic material has begun and while the extruder die is cold, i.e. at about room temperature, the piston arm 14 is first actuated by pneumatic or hydraulic pressure through line 18 so as to push the drive shaft 1 and the connected rotary cutter assembly 5 forward to a substantially closed position on the die plate 9. Then, by turning the hand grip 32 for rotation of the cylindrical sleeve member 31, the cutting edges of the knife blades 8 can be carefully set such that they just contact the exposed face of the annular die plate 9. If the circumferential scale 43 is constructed as a turnable annular ring mounted on the sleeve 31, it can then be rotated until the zero mark is just opposite the notch 44 and then tightened in place by means of a set screw.

In order to provide the correct setting of the rotary cutter for granulation at the extrusion temperatures and pressures, the hand grip 32 is then rotated in the opposite direction so as to axially withdraw the knife edges away from the die plate a short distance which will be indicated on the calibrated scale, e.g. corresponding to the position of the rotary cutter as shown in FIG. 1.

Different settings of this gap space between the knife blades and the die plate are generally required, depending upon the material being granulated and the frequent changes in temperature and pressure of the extrusion process. However, if these conditions can be predicted or once determined for any particular thermoplastic material, the precise gap space can be accurately measured or at least closely approximately with the fine adjustment of the rotatable sleeve 31 before extrusion and granulation. Also, the gap space can be readjusted at any time during granulation by a relatively slow and careful rotation of the sleeve 31.

The axially fixed arrangement of the adjusting sleeve 31 on the apparatus framework 34 on the one hand and its playless seating on the thread of the piston sleeve 27 together with the playless bearing connection between the drive shaft 1 and the piston arm 14 all contribute to preserve a true-to-measure axial setting of the cutting gap corresponding to the indicated position on the calibrated scale 43. Similarly, the guide or retaining pin 29 fitted into slot 28 prevents the sleeve 27 and the remainder of the piston assembly from turning on its axis of rotation and compels the piston assembly to shift with an exact axial movement without any rotational play.

The apparatus of the invention is especially advantageous in that it provides a piston means for the rapid axial shifting of the rotary cutter over a distance which is generally two or more times the axial width of the cutter, thereby permitting easy access to the cutting blades, while it also provides a fine adjusting means for the slow and precise axial shifting of the rotary cutter to give the most efficient gap for cutting the extruded material into uniform granules. It will be obvious that in making this fine adjustment, one is dealing with an axial movement of the rotary cutter so as to provide a cutting gap space of only fractions of a millimeter. Otherwise, if this gap space is too large, the extruded material cannot be cleanly cut and the resulting granules would be deformed in an undesirable manner. Therefore, it is helpful to employ relatively fine adjusting threads 39 and 40 and/or to increase the effective diameter of these threads, preferably such that the diameter of the adjusting threads is larger than the piston cylinder and several times larger than the piston arm or cutter drive shaft.

During operation of the granulating device, the cutting gap may become larger or smaller due to a number of conditions such as the consistency or hardness of the extruded and cooled strands, the temperature of the extruder die plate and/or the temperature of the cooling fluid in chamber 3, or the rotational velocity of the knife blade assembly. It is possible with the apparatus of the invention to compensate for all of these factors, simply by making the fine adjustment of the cutting gap while observing the condition of the granules as they are cut from the extruded strand or strands issuing from the die plate. Furthermore, the precise adjustment of the cutting gap practically avoids any contact of the knife edges with the annular dieplate, thereby greatly increasing the useful life of these elements.

In achieving the objects and advantages of this invention, it will be apparent that various modifications can be made in the particular embodiment of a granulating device as illustrated hereinabove without departing from the spirit and scope of the invention. Accordingly, the invention should not be limited except as defined in the appended claims.

The invention is hereby claimed as follows:

1. Apparatus for granulating a thermoplastic material comprising:
   means for extruding said thermoplastic material including a die having a planar face from which said material issues as at least one strand;
   rotary cutting means including a cutter head on a rotatable and axially slidable drive shaft and a knife assembly mounted on said cutter head to sweep across said planar die face and cut the extruded material into granules;
   piston means including a piston housing secured against rotation around its axis and a piston arm coaxial with and operatively connected through said drive shaft to said rotary cutting means for rapid axial shifting of said rotary cutting means to and from said planar face of said die; and
   fine adjusting means including an axially fixed rotatable cylindrical member concentrically mounted around said piston housing in supporting contact therewith and threadably engaged with a cylindrical portion of said piston housing, with means for rotatably turning said cylindrical member to cause a slow and precise axial shifting of said piston means together with said rotary cutting means toward and away from said planar die face.

2. Apparatus as claimed in claim 1 wherein said fine adjusting means comprises a rotatable wheel with an inner thread on its hub threadably engaged in the outer thread of an adjustable sleeve extending coaxially with and connected to said piston housing.

3. Apparatus as claimed in claim 2 wherein said wheel is constructed as a hand grip for manual actuation of said fine adjusting means.

4. Apparatus as claimed in claim 2 wherein circumferential scalar means are provided in combination with said wheel to accurately measure its degree of rotation.

5. Apparatus as claimed in claim 1 wherein said axially fixed rotatable cylindrical member is associated with means to adjustably counteract its rotation so as to prevent play in the axial movement of said piston means and said rotary cutting means.

6. Apparatus as claimed in claim 5 wherein said means for adjustably counteracting the rotational movement of said cylindrical member comprises a counteracting nut threadably mounted adjacent said cylindrical member and attached thereto by at least one adjustable set screw.

References Cited
UNITED STATES PATENTS

| | | | |
|---|---|---|---|
| 2,524,751 | 10/1950 | Berger | 18—12 |
| 2,629,132 | 2/1953 | Willcox et al. | 18—30 |
| 3,143,766 | 8/1964 | Rohn | 18—12 |
| 3,271,820 | 9/1966 | Hendry | 18—12 |
| 3,271,821 | 9/1966 | Street | 18—12 |

WILLIAM J. STEPHENSON, *Primary Examiner.*